July 1, 1952 — R. C. FREVIK — 2,601,776
METHOD OF DETERMINING SOIL PRESSURES PRODUCED ON THE SOIL
WORKING SURFACES OF GROUND ENGAGING TOOLS
Filed Sept. 3, 1949
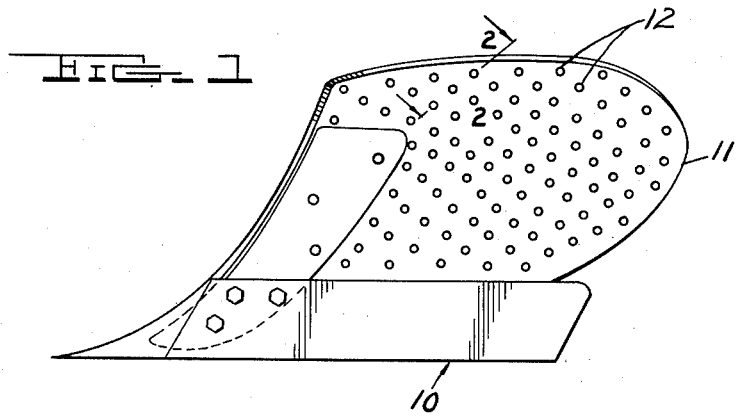
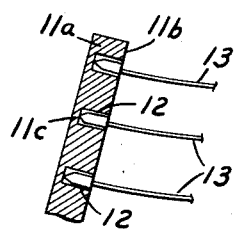
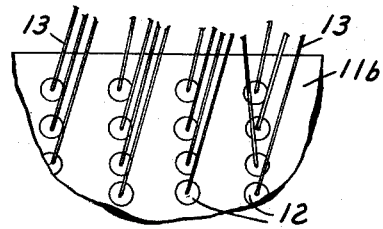
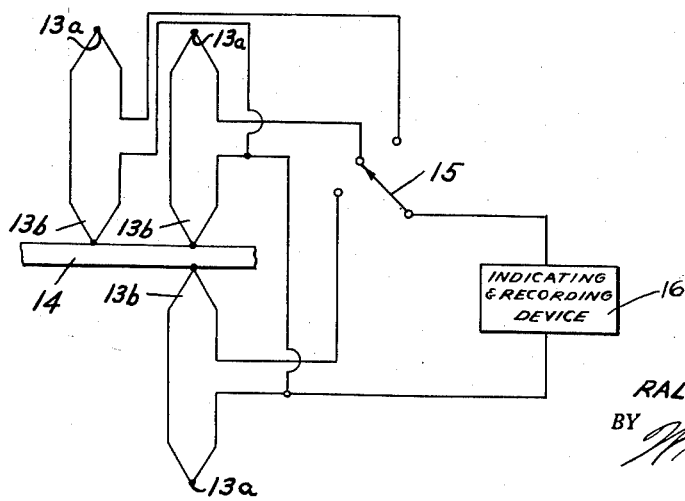
INVENTOR.
RALPH C. FREVIK
BY
ATTORNEY Patented July 1, 1952

2,601,776

UNITED STATES PATENT OFFICE 2,601,776

METHOD OF DETERMINING SOIL PRESSURES PRODUCED ON THE SOIL WORKING SURFACES OF GROUND ENGAGING TOOLS

Ralph C. Frevik, Detroit, Mich., assignor to Dearborn Motors Corporation, Highland Park, Mich., a corporation of Delaware Application September 3, 1949, Serial No. 114,035

1 Claim. (Cl. 73—9)

This invention relates to a method for determining localized soil pressures produced on the soil working surfaces of ground engaging tools, which is particularly adaptable to determining the relative soil pressures exerted upon various localized regions of the share and moldboard of a plow.

The development of plow bottoms, cultivator sweeps, or other soil working tools to reduce the required tractive effort without adversely affecting their soil working characteristics has long occupied the attention of the agricultural industry. However, such design work heretofore had to proceed more or less on a "cut and try" basis, due primarily to a complete lack of measuring technique or equipment for comparing the relative performance of different designs. There are, of course, instruments available for measuring the over-all tractive effort required to pulling ground working implements through the soil, but measurements of this type are of little value in determining whether any particular local configuration of the soil working surface of the implement constitutes an asset or a liability to the performance of the implement. Furthermore, there are so many different soils in the world and their characteristics vary so widely and unpredictably that the performance of any particular design of soil working tool in the different soils could not be reliably predicted without actual tests in all such soils.

Farm equipment designers have long been in agreement that very significant information for the improvement of soil working implements could be obtained if the relative soil pressures exerted on various localized regions of the ground engaging surface of the implement could be measured or indicated. Prior to this invention, no satisfactory method was known for determining relative soil pressures on localized areas of the ground engaging surfaces of soil working implements, such as the scouring surfaces of plows, cultivator sweeps, and the like.

Accordingly, it is an object of this invention to provide an unusually simple yet effective method for measuring the relative soil pressures exerted on various localized regions of the soil engaging surfaces of a farm implement.

A further object of this invention is to provide a method for relative determination of localized soil pressures on the working surface of a farm implement involving the use of a simple and reliable measuring apparatus which may be conveniently employed in actual field tests.

A particular object of this invention is to provide a method of measurement of localized soil pressures on the ground engaging surfaces of implements by recording the variations of temperatures produced in such localized areas as the implement is operated in the ground.

The specific nature of this invention, as well as other objects and advantages thereof, will become apparent to those skilled in the art from the following detailed description, taken in conjunction with the attached sheet of drawings on which, by way of preferred example only, is illustrated one form of apparatus for carrying out the method of this invention:

On the drawings:

Figure 1 is a side elevational view of a conventional plow including a moldboard which has been modified to carry out the soil pressure measuring method of this invention.

Figure 2 is an enlarged scale, partial sectional view taken on the plane 2—2 of Figure 1.

Figure 3 is an enlarged scale, fragmentary elevational view of the back or nonworking surface of the moldboard of the plow of Figure 1.

Figure 4 is a schematic circuit diagram illustrating the electrical circuit employed in carrying out the method of this invention.

As shown on the drawings:

It is, of course, obvious to those skilled in the art that a substantial degree of pressure is exerted by the soil upon the working surfaces of any ground working implement as such implement is advanced through the soil. Such pressure, coupled with the movement of the implement relative to the soil, inherently results in the creation of friction between all of the soil engaging surfaces of the implement and the soil through which such surfaces are moved. In accordance with this invention, the relative amount of such friction is measured at localized regions on the soil engaging surface by measuring the variations in temperature of such localized regions which are produced as the implement is pulled through the ground. Since the velocity of all portions of the working surface of the implement relative to the soil is substantially constant, it necessarily follows that the aforementioned temperature variations are a direct function of the soil pressure upon the various localized regions and may therefore be accurately utilized to indicate the relative soil pressures exerted upon any selected localized regions on the working surface of an implement.

More specifically, this invention contemplates the measurement of such localized temperature variations by the mounting of a suitable temperature responsive element on the back surfaces of the selected local regions of the soil working surface. For example, a thermocouple may be mounted in intimate contact with the back surface of each localized region for which soil pressure comparisons are desired.

Referring to Figures 1 through 3, there is illustrated a particularly convenient method of mounting the thermal responsive units on a soil working implement so as to be respectively responsive to the temperature variations of various regions of the soil working surface of the implement. While the principles of this invention may obviously be applied to any type of soil working implement, the particular application thereof herein illustrated is in connection with the measurement of relative localized soil pressures upon the moldboard 11 of a plow bottom 10. The front face 11a of moldboard 11 has the usual complex curvature configuration and is, of course, highly polished to reduce the frictional drag of soils passing in contact therewith. To determine the relative soil pressure at any localized region on the front face 11a of moldboard 11, the rear face 11b is recessed at such region, as by having a hole 12 formed therein, and such recesses are provided at each region on the moldboard where it is desired to ascertain the relative soil pressure. Each recess 12 extends into the moldboard 11 to a substantial extent but does not break through the working surface 11a, and leaves a reduced thickness wall portion 11c at each region where soil pressure comparisons are desired. A thermocouple unit 13 is then provided for each of the recesses 12. Each thermocouple unit has, of course, two dissimilar metal juinctures, and one juncture 13a is mounted in the corresponding recess 12 in intimate engagement with the bottom of such recess. The other dissimilar metal juncture 13b of each thermocouple unit 13 is exposed to any suitable reference temperature, such, for example, as by being attached to a relatively massive metallic reference temperature block 14.

As is well known, each thermocouple unit 13 will function to generate a small voltage which is proportional to any variations in temperature of the one juncture 13a relative to the juncture 13b. Such voltage variations are indicated or recorded by conventional apparatus which may be conveniently carried either directly on the frame (not shown) which supports the plow 10 or on the prime mover (not shown) which pulls the plow through the soil. For example, the various thermocouple units 13 may be connected through a conventional selector switch unit 15 to an indicating and recording device 16. Selector switch 15 may be either of the manual or motor-driven type as may be desired. The indicating and recording device likewise constitutes a well known apparatus and functions simply as a voltmeter serving to indicate the voltage generated in the particular thermocouple unit 13 to which it may be connected by the selector switch 15. If desired, the indicating and recording device 16 may include a recording type voltmeter so that an inked record is produced for each particular test run.

When the aforedescribed connections have been made, the ground working implement is then pulled in the normal manner through the soil, the only precaution being to insure that the working depth of the implement is sufficient to immerse the particular localized regions which are under study. As the implement is pulled through the soil, the soil pressures on the various regions of the working surface of the implement will result in frictional effects being exerted on such working surface and hence the temperatures of the various localized regions of the working surface will vary as a function of such soil pressures. The temperature variations are in turn translated into electrical variations by the thermocouple units 13, and the electrical variations are indicated and/or recorded by the indicating and recording device 16.

Accordingly, it is apparent that this invention provides an unusually simple yet reliable method of measurement of the relative soil pressures exerted upon any selected localized regions of the soil working surfaces of an implement, and the result of such measurements will obviously materially benefit design studies looking toward improvement of the draft characteristics of soil working implements.

It will, of course, be understood that many details of construction may be varied through a wide range without departing from the principles of this invention and it is, therefore, not the purpose to limit the patent granted hereon otherwise than necessitated by the scope of the appended claim.

I claim:

The method of measuring localized soil pressures on the soil working surface of a ground engaging tool comprising the steps of recessing the back side of said soil working surface at a plurality of points to be studied to produce localized regions of reduced wall thickness, positioning a thermal sensitive unit in each of said recesses so as to be responsive to the temperatures of said reduced wall thickness regions due to friction when the tool is moved through soil, moving said tool through soil at such depth as to immerse said localized regions, and recording the response variations of said thermal sensitive units.

RALPH C. FREVIK.

REFERENCES CITED

The following references are of record in the file of this patent:

UNITED STATES PATENTS

| Number | Name | Date |
|---|---|---|
| 2,314,753 | Asimow | Mar. 23, 1943 |

FOREIGN PATENTS

| Number | Country | Date |
|---|---|---|
| 524,164 | France | May 9, 1921 |